I. McFADDEN.
MOTION PICTURE MACHINE.
APPLICATION FILED JULY 29, 1918.
1,318,889.
Patented Oct. 14, 1919.
3 SHEETS—SHEET 1.
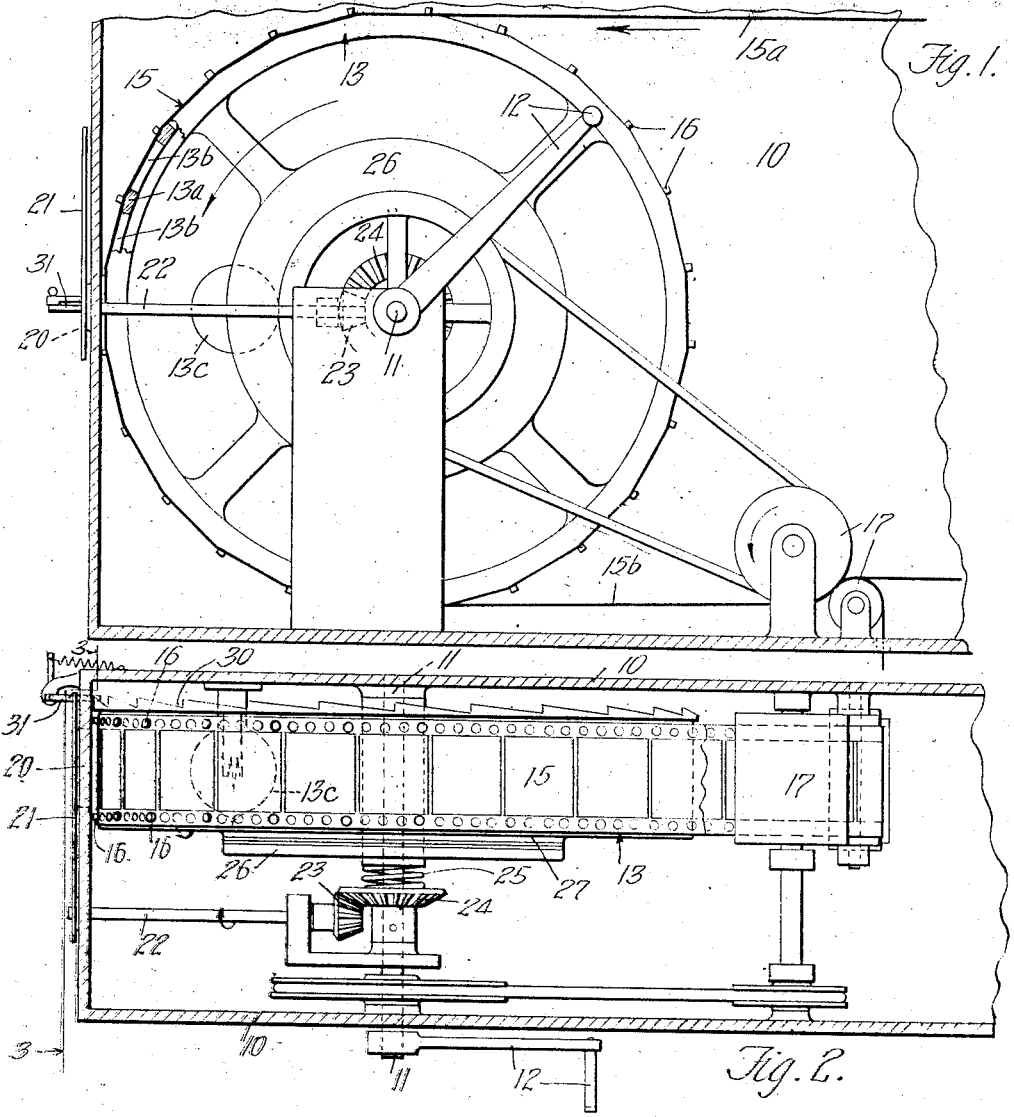
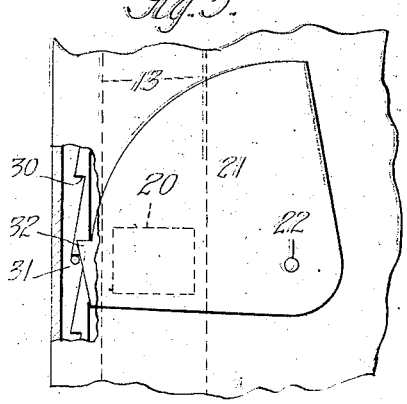
Inventor
Ivor McFadden I. McFADDEN.
MOTION PICTURE MACHINE.
APPLICATION FILED JULY 29, 1918.

1,318,889.

Patented Oct. 14, 1919.
3 SHEETS—SHEET 2.

Inventor
Ivor McFadden.
By
James T. Buckley
his Atty.

I. McFADDEN.
MOTION PICTURE MACHINE.
APPLICATION FILED JULY 29, 1918.
1,318,889.
Patented Oct. 14, 1919.
3 SHEETS—SHEET 3.
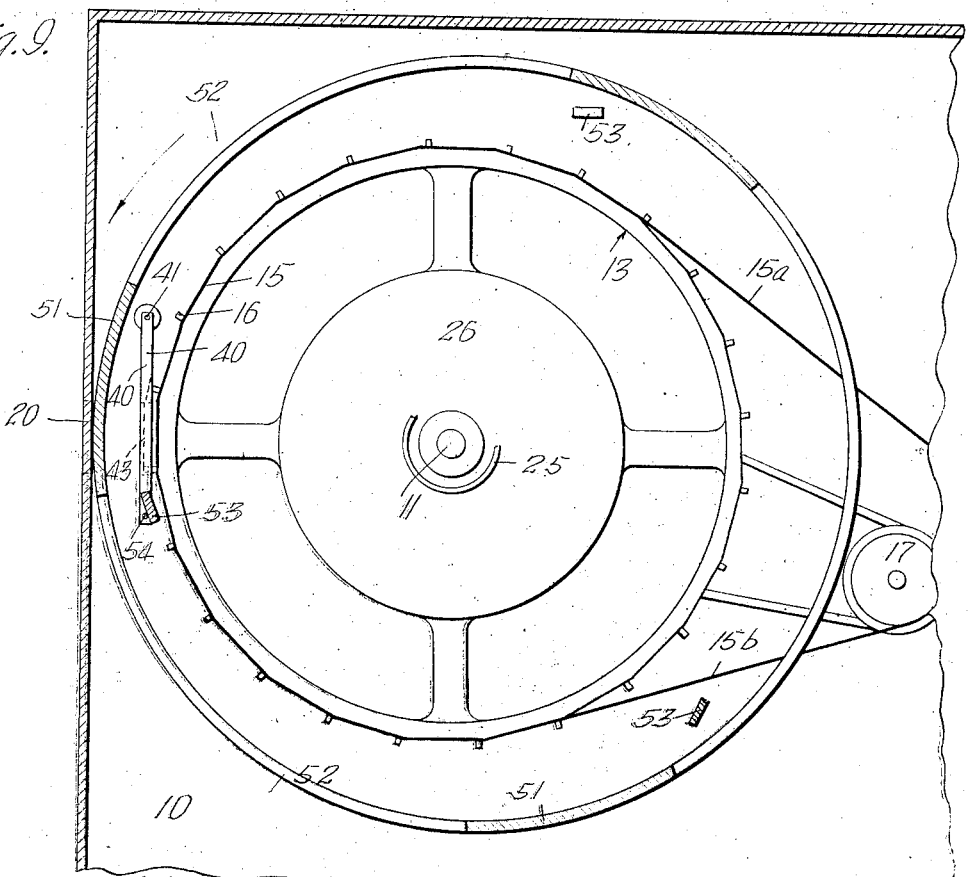
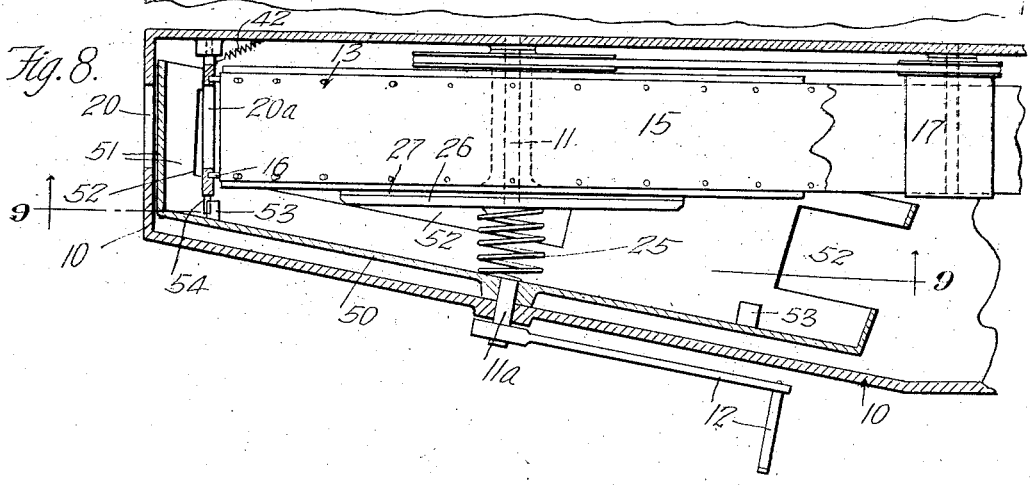
Inventor
Ivor McFadden.
By James T. Banks
His Atty.

UNITED STATES PATENT OFFICE.

IVOR McFADDEN, OF LOS ANGELES, CALIFORNIA.

MOTION-PICTURE MACHINE.

1,318,889. Specification of Letters Patent. Patented Oct. 14, 1919.

Application filed July 29, 1918. Serial No. 247,171.

*To all whom it may concern:*

Be it known that I, IVOR McFADDEN, a citizen of the United States, residing at Los Angeles, in the county of Los Angeles, State of California, have invented new and useful Improvements in Motion-Picture Machines, of which the following is a specification.

This invention relates to moving picture machinery, and relates generally to machinery for taking or printing or projecting moving pictures; and the object of the invention is to provide a machine of great simplicity capable of being manufactured at a very low cost and at the same time giving good moving picture effects. It is an object of the invention to provide a machine so low in cost and so simple in operation that such machines may be universally used to take and exhibit motion pictures in many cases and places where only still pictures are now used and exhibited. It is further an object of this invention to provide a mechanism which may be used as a camera or a projector mechanism, or as a mechanism for printing motion picture films and the like, or to provide a machine which may be used for either transmission projection (as with a transparent film) or for reflecting projection (as where a series of opaque reflective pictures are used). And it is further an object to produce a mechanism which, although useful in ordinary commercial motion picture work, may be particularly adapted by its simplicity to be used as a "toy" machine to exhibit motion pictures by direct vision.

With these objects in view the invention will be best understood from the following detailed description of preferred forms of the device embodying this invention, reference being had to the accompanying drawings in which—

Figure 4:
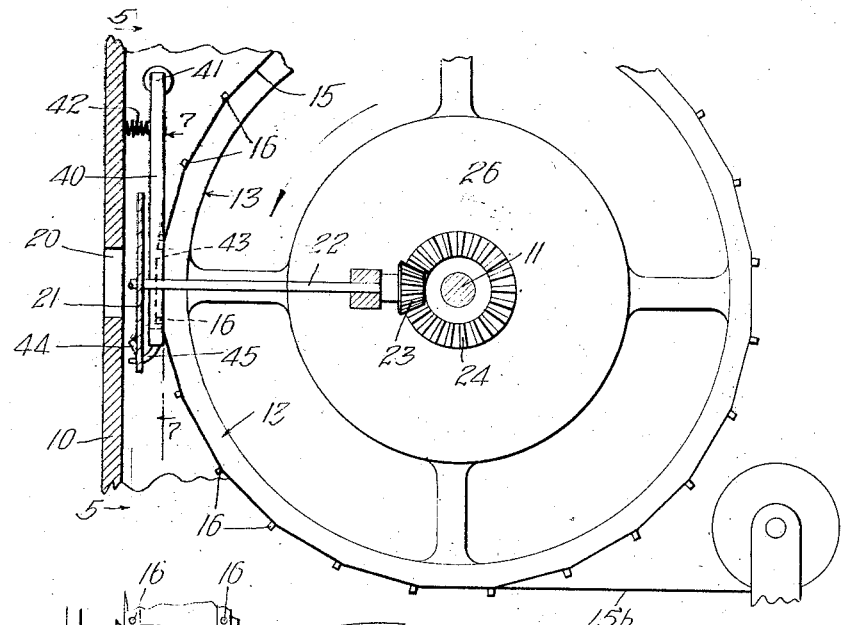
Figure 5:
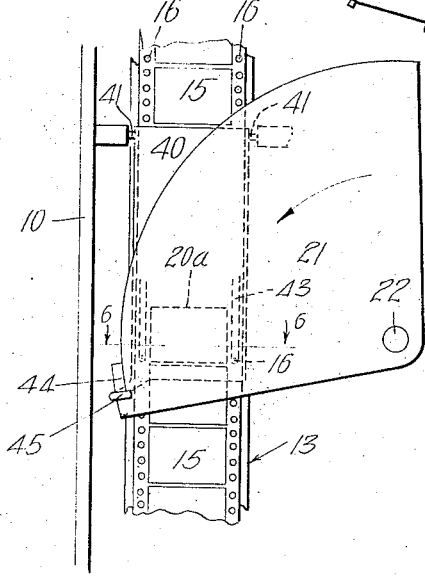
Figure 7:
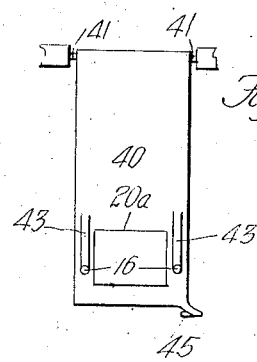
Figure 6:
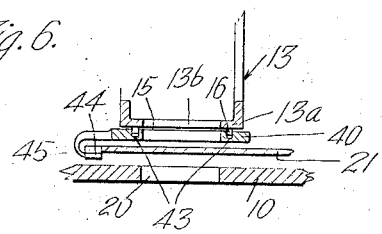

Figure 1 is a side elevation of my improved mechanism; Fig. 2 is a plan thereof, the inclosing box being shown in section; Fig. 3 is a section taken on line 3—3 of Fig. 2; Fig. 4 is a side elevation of a modified form of mechanism; Fig. 5 is the view taken on line 5—5 of Fig. 4; Fig. 6 is a detail section taken on line 6—6 of Fig. 5; Fig. 7 is a view taken as indicated by line 7—7 on Fig. 4; Fig. 8 is a plan section of another modified form of mechanism; and Fig. 9 is a vertical section of the same on line 9—9 of Fig. 8.

In the drawings the numeral 10 designates any suitable inclosing box which may be of any kind or character, light proof in case of use of the mechanism as a camera, or this inclosing box may be a mere frame when the device is being used as a projector. Within this box I mount a horizontal shaft 11 which has a crank handle 12 on one end for its operation. Upon shaft 11, and preferably loosely mounted thereon so that it does not directly rotate with the shaft, I mount a film or picture carrying wheel 13. This wheel may preferably be of comparatively large size so that its peripheral speed will be fairly high when the shaft 11 is rotated at a normal speed of rotation. The film or other picture carrying strip 15 passes over the periphery of this wheel; and the wheel may be provided with teeth or pins 16 on the opposite edges of its periphery to engage the sprocket holes of the film. In using an ordinary film it is not necessary that there be as many pins 16 as there are sprocket holes in the film. One pin on each side of the wheel for such picture on the film will amply suffice to give good driving engagement between the wheel and the film or other picture strip. And in the use of a picture strip especially made for this type of machine, it is only necessary to provide a strip with pin holes spaced apart as here indicated—one pair of holes for each picture. The film or other strip passes around the wheel in the direction indicated, entering at 15$^a$ and leaving at 15$^b$; and take up rolls may be utilized at 17 to keep the picture strip tight on the wheel 13.

In front of the wheel 13 there is an aperture 20 behind which the individual pictures on the picture strip come to rest as the wheel rotates intermittently. In front of this aperture there is a sector-shaped shutter 21 mounted and revoluble upon a shutter shaft 22 which may be driven through the medium of gears 23 and 24 from the shaft 11. Now although I explain specifically this method and arrangement of driving the shutter it will be readily understood that any other method of connection or arrangement may be used for driving the shutter from shaft 11. In the present arrangement the shutter makes one revolution for each picture movement of wheel 13; in fact, it is the rotation of the shutter which controls the movement of the picture wheel. The picture wheel is actuated from shaft 11 through the medium of a yielding driving element which allows the wheel to be checked in rotation while the shutter rotates. This means may embody simply a frictional or other device—as, for instance, a pair of friction plates 26 and 27 pressed together by the spring 25; or this means may embody a combined frictional and resilient drive—in instance, the spring 25 may be secured at one end to gear 24 and at the other end to plate 26. The spring 25 thus serves to create a certain amount of friction between the two friction plates by pressing them together, and at the same time serves as a resilient yielding driving means between shaft 11 and the picture wheel. The picture wheel is held from constant rotation by a suitable catch means. For instance, the picture wheel may have teeth or notches as illustrated at 30 on its edge, and a spring actuated pivoted pawl 31 may be arranged so as to engage these notches to prevent rotation of the picture wheel. Upon each revolution of the shutter, a part 32 on its edge comes into engagement with the pawl and presses it out from the picture wheel and thus releases the picture wheel so that the wheel is then moved ahead through the driving action of the friction plates and spring 25, which spring has been tensioned by the rotation of shaft 11. The shutter, however, revolves fast enough so that pawl 31 is allowed to drop back against the picture wheel before the wheel has rotated far enough to carry the next notch past the pawl and the pawl accordingly drops into the next notch and stops rotation of the wheel. The arrangement of the parts, the strength of the spring, etc., are made such that the movement of the picture wheel is consummated during the time that the shutter covers the aperture 20; so that when the shutter uncovers the aperture the next picture is exposed behind the aperture. This picture remains exposed behind the aperture until the shutter has made another revolution and has again come to the position to cover the aperture when the shutter again moves pawl 31 and releases the picture wheel and allows it to make its next movement during the period when the shutter covers the aperture again.

The picture wheel is preferably made with a peripheral overhanging flange 13ª with apertures 13ᵇ and a light may be placed at 13ᶜ for transmission projection. The face of the wheel is preferably polygonal, with flat faces so that each individual picture of the picture strip is in flat position when it comes opposite the aperture.

The proportions of the gearing 23, 24, or the arrangements of any other connection between the shaft and the shutter are such that when the wheel checking means is released the wheel will be advanced by its yielding driving means at the proper speed and be moved from one position to the next during the period in which the shutter covers the aperture. When the wheel is checked then the yielding driving means allows the shutter to rotate while the wheel is at rest during the exposure period. The use of this back slip of the wheel, either by frictional arrangement or by resilient arrangement, or both, obviates the necessity of having any accurately timed driving relation between the shutter and the wheel. In fact, the general arrangement might be described by saying that the shutter is driven and the wheel drags behind the shutter in an intermittent motion.

In Figs. 4 and following I show a somewhat modified form of mechanism in which I provide an aperture plate 40 pivoted at its upper end at 41 and pressed by a spring 42 toward the picture wheel 13; so that the aperture plate is as close as possible to the picture wheel, pressing against the picture strip and pressing the strip against the flat face of the wheel during the time of exposure. This arrangement puts the aperture plate as close as possible to the picture strip. The back side of this aperture plate may have two longitudinal grooves 43 on opposite sides of the apertures 20ª, these grooves being so placed that the pins 16 will engage in the grooves and, striking the lower ends of the grooves, will be held against movement and thus hold the wheel against movement. Means are arranged on the shutter for moving the pivoted aperture plate 40 outwardly; and these means may be an inclined part 44 on the shutter 21 which engages behind a projecting part 45 which extends from the edge of aperture plate 40. As soon as the shutter, during each revolution, has covered the aperture, then the aperture plate is moved slightly outwardly enough to release the pins; and during the period that the shutter covers the aperture the picture wheel moves around one step and is stopped by the catching of the next set of pins in the grooves of the aperture plate which has moved back to its normal position in the meantime.

In Figs. 8 and 9 I illustrate another form of device in which a further simplification is effected by doing away with the gearing connections to the shutter. In this form of device I may use the aperture plate 40 as hereinbefore described and wheel 13 is driven in the same manner as hereinbefore described through the medium of the yielding device comprising preferably spring 25 and friction device 26 and 27. However, the spring 25 in this case may have one end affixed directly to the web 50 of a circular shutter which is mounted directly on the shaft 11. This shutter web 50 has a peripheral overhanging flange 51 with shutter openings 52 therein. The peripheral shutter flange encircles the picture wheel. On the shutter wheel there may be arranged several diagonal blocks 53 which correspond in number with the number of openings 52, and are so placed as to come into engagement with a pin 54 projecting from aperture plate 40 when the shutter is covering the opening in the aperture plate; the action of these diagonal blocks being to move the aperture plate outwardly and to thus release the picture wheel so that it may move forwardly while the aperture is covered. The action is essentially the same as hereinbefore described; the particular feature of this form being the shape and arrangement of the shutter and the obviation of the shutter driving means used in the other form. However, in a form of this character, it is necessary to use some special arrangement for getting the film to and away from the picture wheel; and this may be done in various manners. The shutter may be mounted somewhat off-set to the wheel; or more specifically, it may be placed diagonally to the picture wheel so that the rear part of the shutter flange does not interfere with the passage of the picture strip to and from the wheel. In such an arrangement the shutter is mounted on its shaft 11a while the wheel may be mounted on a separate off-set shaft 11; and the spring 25 performs the office of a universal driving connection between the shutter and the friction plates.

It will be understood that any form of my device may be used either in a camera mechanism or in a projector mechanism or in a printing mechanism. It will be readily understood how the device may be used in a projection mechanism, using either transparent films or opaque reflective picture strip; and it will also be understood how the device may be used in a camera mechanism for taking pictures. And my apparatus may further be used for printing films and the like by merely superposing a negative and a sensitive strip upon the picture wheel and moving a picture wheel at suitable speed to give a proper printing exposure to a light which is directed through the aperture. And my device also, by its simplicity, is particularly useful as a toy motion picture mechanism for direct vision without any projecting light, lenses, etc.

Having described a preferred form of my invention, I claim:

1. In a motion picture machine, the combination of a picture strip carrying wheel, a movable shutter before said wheel, means to drive the shutter and means to drive the picture wheel embodying a yielding element whereby the picture wheel may be checked while the shutter is in motion, means to check rotation of the wheel, and means actuated by the shutter to release said checking means.

2. In a motion picture machine, the combination of a picture strip carrying wheel, a movable shutter before said wheel, means to drive the shutter and means to drive the picture wheel embodying a frictional yielding means whereby the picture wheel may be checked while the shutter is in motion, means to check rotation of the wheel, and means actuated by the shutter to release said checking means.

3. In a motion picture machine, the combination of a picture strip carrying wheel, a movable shutter before said wheel, means to drive the shutter and means to drive the picture wheel embodying a frictional and resilient yielding means whereby the picture wheel may be checked while the shutter is in motion, means to check rotation of the wheel, and means actuated by the shutter to release said checking means.

4. In a motion picture machine, the combination of a picture strip carrying wheel, a rotative shutter before said wheel, means to rotate the shutter and means to rotate the wheel from the shutter rotating means embodying a yielding element so that the wheel may be checked while the shutter is in rotation, and means actuated by the shutter to release said checking means.

5. In a motion picture machine, the combination of a picture strip carrying wheel, a rotative shutter before said wheel, means to rotate the shutter and means to rotate the wheel from the shutter rotating means embodying a yielding element so that the wheel may be checked while the shutter is in rotation, and means actuated by the shutter to release said checking means, said shutter embodying a shutter wheel having an apertured flange which surounds the picture wheel.

6. In a motion picture machine, the combination of a picture strip carrying wheel, a movable shutter before said wheel, a movable aperture plate before said wheel, projections on the wheel and means on the aperture plate to engage said projections to check rotation of the wheel, means to drive the shutter and to yieldingly drive the wheel, and means actuated by the shutter to move said aperture plate to release it from engagement with the projections on the wheel.

7. In a motion picture machine, the combination of a picture strip carrying wheel, a movable shutter before said wheel, a movable aperture plate before said wheel, projections on the wheel and means on the aperture plate to engage said projections to check rotation of the wheel, means to drive the shutter and to yieldingly drive the wheel, and means actuated by the shutter to move said aperture plate to release it from engagement with the projections on the wheel; said wheel driving means including a yielding frictional element.

8. In a motion picture machine, the combination of a picture strip carrying wheel, a movable shutter before said wheel, a movable aperture plate before said wheel, projections on the wheel and means on the aperture plate to engage said projections to check rotation of the wheel, means to drive the shutter and to yieldingly drive the wheel, and means actuated by the shutter to move said aperture plate to release it from engagement with the projections on the wheel; said wheel driving means including a frictional and resilient yielding element.

9. In a motion picture machine, the combination of a picture strip carrying wheel, a rotative shutter wheel having a peripheral flange extending around the picture wheel and provided with apertures, means to drive the shutter and means to yieldingly drive the picture wheel from the shutter driving means, a movable aperture plate before the wheel, projections on the wheel and means on the aperture plate to engage said projections and check rotation of the wheel, and means actuated by the shutter to move said aperture plate to release its engagement with said projections.

10. In a motion picture machine, the combination of a picture strip carrying wheel, a rotative shutter wheel having a peripheral flange extending around the picture wheel and provided with apertures, means to drive the shutter and means to yieldingly drive the picture wheel from the shutter driving means, a movable aperture plate before the wheel, projections on the wheel and means on the aperture plate to engage said projections and check rotation of the wheel, and means actuated by the shutter to move said aperture plate to release its engagement with said projections; said driving means for the wheel including a pair of friction plates and a spring.

11. In motion picture mechanisms, a picture strip carrying wheel having a polygonal periphery, and a movable aperture plate before the wheel adapted to lie flatly against a picture strip on the polygonal faces of the wheel.

12. In motion picture mechanisms, a picture strip carrying wheel having a polygonal periphery, and a movable aperture plate before the wheel adapted to lie flatly against a picture strip on the polygonal faces of the wheel; said aperture plate being pivoted at one end, and spring means to press the aperture plate toward the wheel.

13. In a motion picture machine, the combination of a movable carrier for a picture strip, a shutter, means to drive the shutter and checkable means to drive the carrier, and checking means for the carrier actuated by the shutter.

In witness that I claim the foregoing I have hereunto subscribed my name this 13th day of July 1918.

IVOR McFADDEN.